Figure 1:
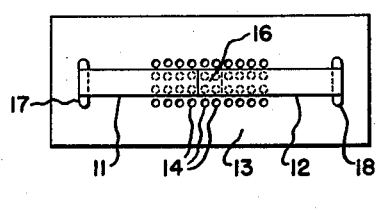

Dec. 8, 1959   R. J. REID ET AL   2,916,537
THERMOCOUPLE ELEMENT
Filed Dec. 27, 1956

INVENTORS
ROBERT J. REID &
WAYNE M. GROSS
BY
ATTORNEY

United States Patent Office 2,916,537
Patented Dec. 8, 1959

2,916,537

THERMOCOUPLE ELEMENT

Robert J. Reid, El Cajon, and Wayne M. Gross, Poway, Calif., assignors to General Dynamics Corporation, San Diego, Calif., a corporation of Delaware Application December 27, 1956, Serial No. 630,820

10 Claims. (Cl. 136—4)

This invention relates to thermocouples and more particularly to a thermocouple element having high sensitivity and quick response.

A thermocouple is a device which generates an electrical current when its temperature is raised. Two junctions are formed of wires or bands of dissimilar thermoelectric materials, such for example as silver and bismuth, tin and bismuth, lead and zinc, copper and platinum, copper and nickel, copper and constantan, iron and constantan, copper and iron, or other dissimilar metals, alloys or other materials separated in the thermoelectric series well known in the art. If one junction is subjected to heat while the other is maintained at the original temperature, an electric current will be generated indicative of the difference in temperature between the two junctions.

There has been an ever growing need for a very fast temperature indicating device for the measurement of rapidly changing air temperatures. One pressing need is for a device that will register the changing air temperatures encountered by modern supersonic aircraft during manuevers. These widely varying temperatures might be caused by explosions or rockets passing through the air. Thus the hot air region would be rather narrow and its temperature quite high in comparison to the ambient air temperature. The operation of airplanes may be critically affected by wide changes in the temperature of the air through which it passes. Suppose there is a region of air at 560° F. which is 100 ft. wide. If the ambient air is +60° F. there is a change in temperature of 500° F. If an aircraft flies through it at Mach 1, the total time that the airplane would be in this hot region would be 0.091 second. Therefore, in order for aircraft systems to have time to adjust to this large air temperature change, the sensing element should be able to give a total response in 0.01 to 0.02 second. Any thermocouple element used must not only have a very fast response time but must also be strong enough to support itself in a high speed air stream. The two requirements are not compatible in heretofore known thermocouple elements.

Thermocouples are usually either of rugged construction and relatively insensitive, moderately constructed with moderately high sensitivity or delicately constructed with ultrasensivity. In this latter group, for example, wires of three or four one-thousandths of an inch are soldered or welded under microscopes and the junction mass was made as small as possible to keep its thermal mass to a minimum. However, not only were these difficult to make but the response time was too long for very fast response requirements.

To obtain high sensitivity and quick response, thermocouple elements comprising strips measured in microns of thickness are used. Such elements are produced by chemical deposition, i.e. from solution, electroplating, evaporation, printing, spraying, dusting, vacuum processes or sputtering.

The deposits constituting the elements of the thermocouple may form a butt or overlap junction, or may be spaced and bridged by a deposit of a suitable third material. In overlap junctions the deposits may be formed simultaneously so that the dissimilar materials become fused at the zone of overlap. Thermocouple elements thus fabricated are extremely fragile and require some form of supporting surface. If the thickness of the supporting material is large in relation to the thickness of the deposit, even though it is of insulating material, there will be a loss of heat by conduction. This lowers the temperature gradient between the hot and cold junctions and the sensitivity of the element unless the thermal conductivity of the support is only a small fraction of that of the elements. Supports of thin porous material having a poor conductance of heat and electricity have been used. These comprise papers, such as rice paper and cigarette paper, fibrous substances such as thin asbestos fabric, and cellular material such as wings of certain insects, all of which exhibit the property of a decrease in thermal conductivity under a high vacuum. These supports however must be sealed in a vacuum and lack the required strength to withstand vibration and exposure to a high speed air stream.

The thermocouple element comprising the present invention consists of a junction formed with dissimilar thermoelectric materials mounted on a special support. To reduce the thermal mass to an absolute minimum to achieve instantaneous response, an evaporated metal film is used. The support for this film is of a material strong enough to support the film in a high speed air stream, which has a linear coefficient of expansion the same or slightly less than the film used, has a low heat conductance so that heat will not be taken away from the junction faster than it is supplied by the air. The support is of a material that can be vacuum metalized and has a good adhesion to the metal film. It must also be able to withstand a temperature of 300° F. to 500° F. for several seconds without being damaged.

It is therefore an object of this invention to provide for a new and improved thermocouple element having a junction formed by dissimilar materials in the thermoelectric series and supported by a material which has a minimum of interference with its sensitivity.

Another object is the provision of a thermocouple element having a fast response time.

Another object is the provision of a thermocouple element of high sensitivity yet which is of sufficiently rugged construction to withstand a high speed air stream.

Another object is the provision of a thermocouple element having a junction which is capable of absorbing heat as fast as it can be supplied by conduction and convection.

Another object is the provision of a support for a thermocouple junction having a low heat conductance so that heat will not be taken away from the junction faster than it is being supplied under dynamic temperature conditions.

Still another object is the provision of a thermocouple element having a junction formed by dissimilar metallic film metalized on a support suitably characterized by its coefficient of expansion, specific heat capacity, heat and electrical conductance, strength, metalizing properties and ability to withstand heat.

Figure 2:
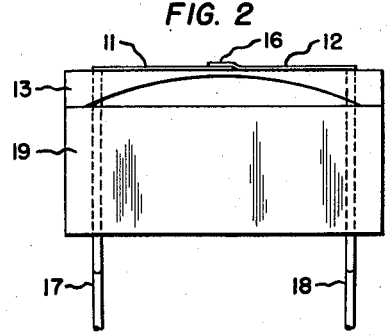
Figure 3:
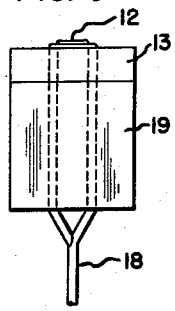
Figure 4:
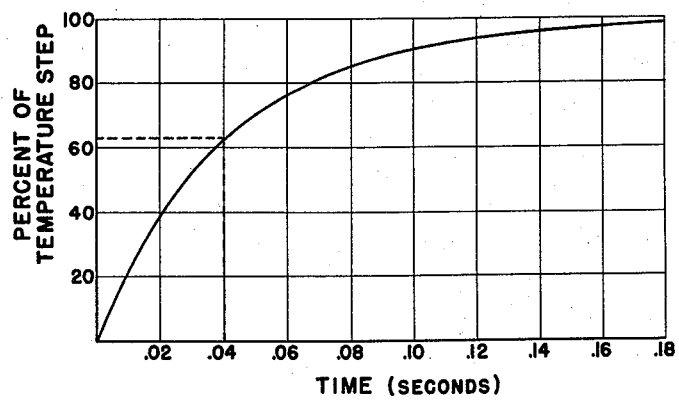
Figure 5:
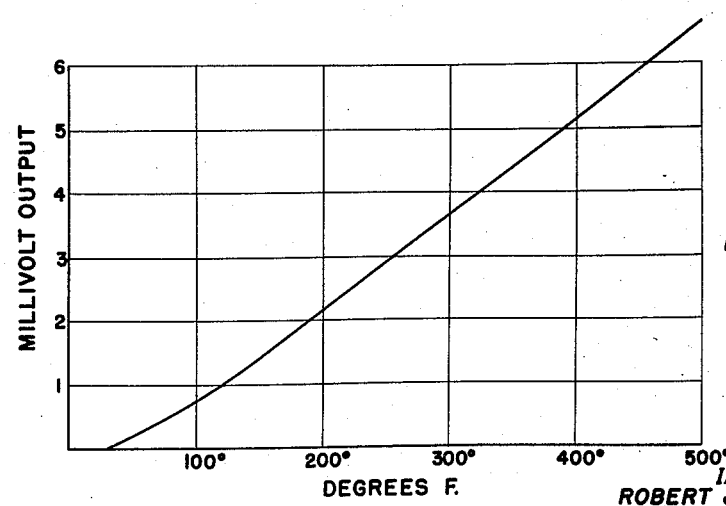

Other objects and features of the present invention will be readily apparent to those skilled in the art from the following specification and appended drawings wherein is illustrated a preferred form of the invention, and in which:

Figure 1 is a plan view of the preferred embodiment;
Figure 2 is an elevational view;
Figure 3 is a right end view;

Figure 4 shows a typical time response curve; and
Figure 5 is a sample calibration chart.

Reference is now made to the drawings wherein like numerals designate like parts throughout the several views. As shown in the plan view in Figure 1, two thin strips 11 and 12 of dissimilar material in the thermoelectric series extend from either end of support 13 and overlap in the center. A plurality of small apertures 14 in the support allow air to circulate through it to produce a thinner boundary layer of air between the hot air and cold thermocouple to permit a faster heat transfer. While the area and thickness of the junction 16 formed by the strips may be varied, the preferred thickness of the strips is about 5000 angstrom units thick. An angstrom unit has been defined as $1 \times 10^{-4}$ microns or $3.937 \times 10^{-9}$ inches. While any of the known bonding techniques may be used, strips 11 and 12 in the preferred embodiment are metalized to support 13 by a vacuum metalizing process. The outer ends of strips 11 and 12 are electrically connected to wire leads 17 and 18 respectively which are preferably of dissimilar materials corresponding to strips 11 and 12. For example, lead wire 17 and strip 11 may be of copper and lead wire 18 and strip 12 may be of nickel.

As shown in Figure 2 support 13 is shaped as an arched bridge and is made very thin (one to two thousandths of an inch) in the center under the junction 16. The outer edges are thicker, approximately 1/16 inch, to provide sufficient strength and circulation of air under the bridge. The material from which this bridge is constructed must possess several characteristics. It must have a linear coefficient of expansion the same as, or slightly less than, the material used in strips 11 and 12. It must have a low heat conductance so that heat will not be taken away from the junction faster than it is supplied by the air. It must be strong enough to withstand a blast of Mach 1 air stream. It must be capable of being vacuum metalized and offer good adhesion to metallic film. Temperatures of 300° F. to 500° F. must be withstood for several seconds without being damaged. It should also have the lowest possible total heat capacity. By making the total volume in the sensitive area as small as possible, bamboo meets all of these requirements. To compensate for the fairly high specific heat of bamboo the arch of the bamboo bridge is made very thin. A bamboo bridge of one thousandth of an inch thickness presents a total heat capacity of that of a wire 4/10,000 of an inch thickness.

Support 13 is secured to a mounting base 19 for protection, ease of handling and mounting. While this base does not have to be of a critical material such as in the bridge support 13, it should be an insulating material, such as one of the epoxy resins for example. Leads 17 and 18 extend laterally across the top of support 13 as shown in Figure 1 and down through suitable apertures in the bridge 18 and base 19, as shown in dotted lines in Figure 2 and Figure 3. Both ends of each lead are brought together, as shown in Figure 3 to form a larger conductive path for connection to the rest of the sensing instrumentation, not shown. After the leads have been attached, an additional metallic coating may be applied to increase the conductance of the connection between the leads and the sensing strips 11 ad 12, if desired. For added protection a coating of silicon monoxide or similar material may be evaporated over the strips and strip-to-lead connections.

Since thermocouples characteristically have an exponential response, it is customary to refer to a time constant. This time constant is defined as the time required for the thermocouple output to reach 63% of its final value with step input conditions. As shown in Figure 4 the time constant for one embodiment utilizing the principles of the present invention is .04 second as compared to the time constant of .2 second for conventional temperature probes. The voltage output with temperature calibration chart is shown in Figure 5.

In situations requiring less response the thickness of the bridge and strips may be varied in accordance with the environment and response requirements. It is to be understood therefore that values herein mentioned were by way of description and not by limitation except as defined in certain of the claims. For example, when used as a sensing element in crystal oven control circuits the response requirements might be less than in the application just described.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A thermocouple element having fast response time to rapidly changing temperatures conducted thereto by air masses of high velocity, said element comprising a junction formed by two dissimilar materials in the thermoelectric series, leads extending from each of said materials, and a support for supporting said materials in a Mach 1 air stream, said support providing continuous support throughout the length of said materials, said support being extremely thin under said junction to reduce heat conduction losses thereto and relatively thicker at the point where the leads extend from said materials to thereby provide a raised undersurface for air circulation thereunder.

2. A thermocouple element as in claim 1, said support being less than two thousandths of an inch thick under said junction to reduce the total heat capacity of said support, said support having a taper to a greater thickness at the ends thereof to provide an air space under said junction.

3. A thermocouple element as in claim 2 wherein the thickness of the ends of said support is in the order of 1/16 of an inch.

4. A thermocouple element capable of quick response to transient temperature conditions comprising a thermocouple junction which can absorb heat as fast as a Mach 1 air stream can conduct it thereto, said junction being supported by a bridge support having perforations therein, said bridge support having a raised undersurface to permit circulation of air through and around said perforations, said junction consisting of strips of dissimilar materials in the thermoelectric series having a thickness less than one micron in overlapping contact, said support being less than two thousandths of an inch thick under said junction and having sufficient strength for supporting said junction when exposed to said Mach 1 air stream.

5. A thermocouple element as in claim 4 wherein the time constant of response of said element is less than .05 second.

6. A thermocouple element capable of quick response to transient temperature conditions comprising a thermocouple junction formed from strips of dissimilar materials in the thermoelectric series of less than one micron thickness, a bridge support for said junction, said support being arched and perforated under said junction to permit circulation of air therearound, said support being extremely thin under said junction to reduce its total heat capacity, said support having a low heat conductance and having sufficient strength to support said junction in a Mach 1 air stream.

7. A thermocouple element as in claim 6, said support being of a temperature resistant material sufficient to withstand temperatures from 300° F. to 500° F. for several seconds.

8. A thermocouple element as in claim 6, said support being of a material capable of being vacuum metalized and having good adhesion characteristics to metalized film.

9. A thermocouple element comprising a junction formed by two dissimilar materials in the thermoelectric series, a bamboo support in contact with said materials, said bamboo support providing continuous support throughout the length of said materials, said bamboo support being tapered to have a minimum finite thickness under said junction.

10. A thermocouple element comprising a thermocouple junction formed by dissimilar materials in the thermoelectric series, a bamboo bridge for supporting said junction, said bridge comprising a top surface adapted to receive said materials, a bottom surface tapering toward said top surface from near each end of said bridge toward the center thereof, said bridge having a minimum finite thickness at said center, the center area of said bridge having perforations extending through the thickness thereof to permit passage of air therethrough.

References Cited in the file of this patent
UNITED STATES PATENTS

| | | |
|---|---|---|
| 149,373 | Clapp | Apr. 7, 1874 |
| 1,942,516 | Noyes | Jan. 9, 1934 |
| 2,381,819 | Graves et al. | Aug. 7, 1945 |
| 2,671,818 | Turck | Mar. 9, 1954 |